Jan. 5, 1943.  J. ERWOOD  2,307,030
PHONOGRAPHIC APPARATUS
Filed Jan. 24, 1941  5 Sheets-Sheet 1

Inventor
Joseph Erwood

Jan. 5, 1943.    J. ERWOOD    2,307,030
PHONOGRAPHIC APPARATUS
Filed Jan. 24, 1941    5 Sheets-Sheet 2

Inventor
Joseph Erwood

Jan. 5, 1943.  J. ERWOOD  2,307,030
PHONOGRAPHIC APPARATUS
Filed Jan. 24, 1941   5 Sheets-Sheet 3

Inventor
Joseph Erwood

Jan. 5, 1943.  J. ERWOOD  2,307,030
PHONOGRAPHIC APPARATUS
Filed Jan. 24, 1941   5 Sheets-Sheet 5

Inventor
Joseph Erwood

Patented Jan. 5, 1943

2,307,030

UNITED STATES PATENT OFFICE 2,307,030

PHONOGRAPHIC APPARATUS

Joseph Erwood, Chicago, Ill.

Application January 24, 1941, Serial No. 375,750

5 Claims. (Cl. 274—15)

This invention relates to phonographic record changers and more particularly record changers of the type in which the records are played one by one in sequence from a stack of records.

As is well known, the mechanism heretofore used in phonographic record changers has been relatively complicated. The more complicated the mechanism the more expensive it is to build, and therefore, the greater the cost is to the consumer. Furthermore, certain record changers which are in use today leave much to be desired because certain portions of the record changing mechanism are continuously moving even during the playing of a record, thereby increasing the possibility of noise, increasing wear and making it necessary to have carefully controlled adjustments to insure that the various part of the record changing mechanism will engage with moving parts thereof at the proper time. Some record changers also suffer from the disadvantage that several adjustments are necessary in order to play different sized records. Others require a relatively large cabinet.

One of the objects of the present invention is to provide a new and improved type of phonographic record changer which is compact, simple in operation and inexpensive to build.

Another object of this invention is to provide a new and improved type of phonographic record changer in which the principal actuating members of the record changing mechanism are idle while the record is being played.

Still another object of this invention is to provide a new and improved phonographic record changer of the character described in which only a single manual adjustment is necessary in order to change from one sized record to another and which adjustment does not require a change in the blades that actually separate and cause the records to be brought into playing position.

A more specific object and feature of the invention is the provision of a new and improved means for lifting the tone arm during the period when a record is being changed.

Still another specific object and feature of the invention is the provision of a new and improved way of driving the record changer blades.

Another more specific object and feature of the invention is the provision of a new and improved mechanism associated with the record changer blades which is more positive in action and less likely to jam than previously proposed mechanisms of this type.

Other objects and features of the invention will be apparent by reference to the following description in conjunction with the accompanying drawings, in which.

Figure 1:
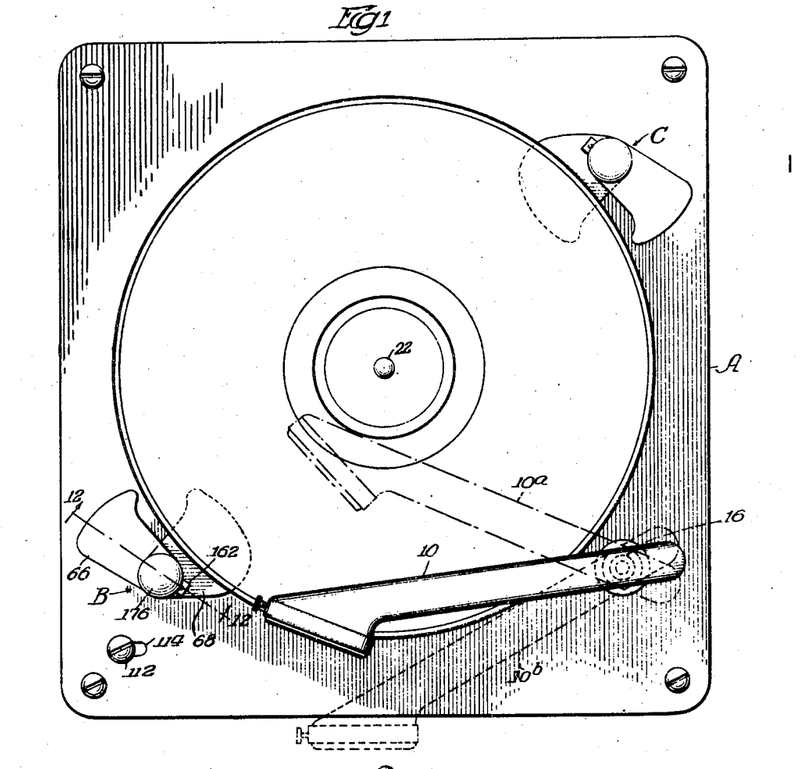
Figure 1 represents a plan view of the phonographic record changer made in accordance with this invention.
Figure 2:
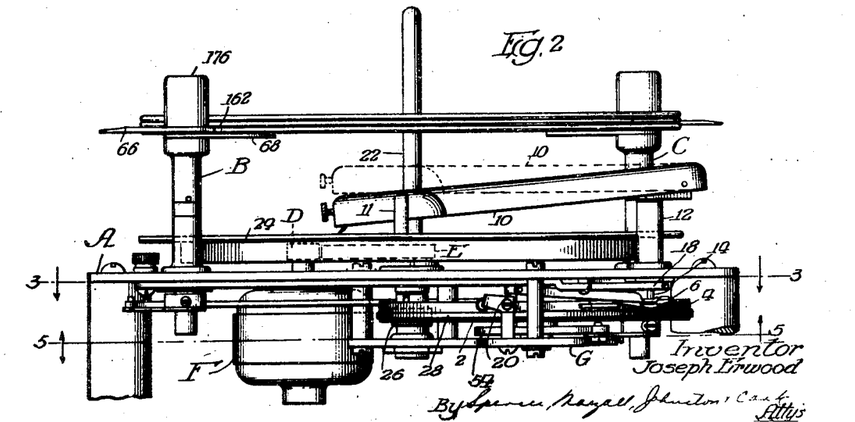
Figure 2 is a side elevational view of the phonographic record changer shown in Figure 1.
Figure 3:
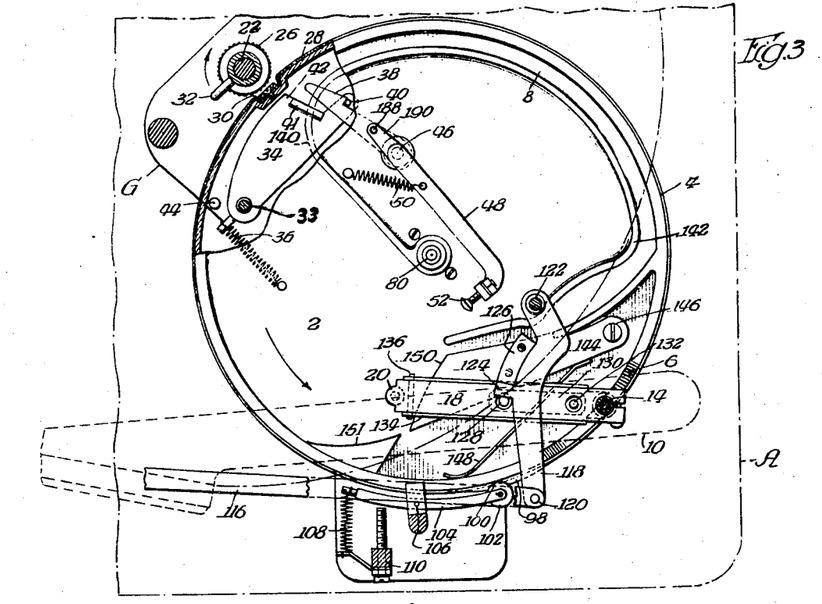
Figure 3 is a plan sectional view with parts broken away taken through the line 3—3 of Figure 2 and showing the various parts of the record changer with the tone arm in starting position.

Referring to Figures 1, 2 and 3, the apparatus illustrated comprises a cam carrier 2 which, as shown, is preferably substantially horizontally disposed. Cam carrier 2 is provided on its upper face with a lift cam which comprises an elevated cam path 4 extending substantially around said cam carrier and with a curved depression 6 in a portion thereof. As shown in Figure 3, cam carrier 2 has a guide cam track 8 formed on the upper surface thereof. A tone arm 10 is rotatively pivoted from a post 12 above said cam carrier 2, as shown in Figure 2. Passing through post 12 is a lift member or pin 14 engaging at its upper end with tone arm 10 and at its lower end riding on cam path 4, thereby causing tone arm 10 to be raised and lowered in response to variations in the elevation of the lift cam or cam path 4. Around the lift member or pin 14 is a sleeve 16 which is also within post 12 and which is connected at its upper end in such a way that it rotates with the rotation of tone arm 10 and which at its lower end is connected with guide arm 18, the latter being shown from above in Figure 3 and in detail in Figure 10. Thus any rotation or swinging movement of the tone arm 10 causes a rotation or swinging movement of guide arm 18 and vice versa.

On the inner end of guide arm 18 is a guide cam roller 20 which is adapted to run in guide cam track 8, shown in Figure 3, while a record is being changed. The cam carrier 2 is driven from a rotating turntable shaft 22 which extends beneath the turntable 24 and has mounted thereon a pinion or driving means 26. Mounted on the periphery of cam carrier 2 is a peripheral driving means 28 which is adapted to engage and to be driven by pinion 26 during the record changing operation. The peripheral driving means 28 may be either friction or a gear drive, or any other suitable type of drive. In the particular embodiment of the invention shown, peripheral driving means 28 is a rubber band or belt which extends around the entire periphery of cam carrier 2 except for a gap 30 shown in Figure 3. While a record is being played, as previously indicated, the driving means or pinion 26 is out of engagement with the friction belt 28 and therefore the rotation of turntable shaft 22 is not imparted to cam carrier 2 and the latter remains stationary.

The rotation of cam carrier 2 is initiated in the following manner. Connected beneath pinion 26 is a pin or projecting member 32 which rotates with pinion 26 and shaft 22. On the under side of cam carrier 2 is affixed a pawl 34 pivoted at point 33 which is normally pressed outwardly by means of a spring 36 but which is held by a catch 36 hooked against a pin 40. The projecting member 32 and the pawl 34 are herein referred to as initiating members. When catch 38 is released from pin 40 pawl 34 moves outwardly sufficiently far to enable projecting member or pin 32 rotating with pinion 26 to engage pawl 34 at point 42 thereby causing cam carrier 2 to begin to rotate and moving it sufficiently far to permit pinion or driving means 26 on shaft 22 to engage peripheral driving means 28 on cam carrier 2. Once the rotation is started in this manner it continues by the continued engagement of pinion 26 and peripheral driving means 28. A raised portion 41 on the upper face of pawl 34 acts as a stop to prevent pawl 34 from swinging farther out than necessary and also stops the movement of catch 38.

Figure 4:
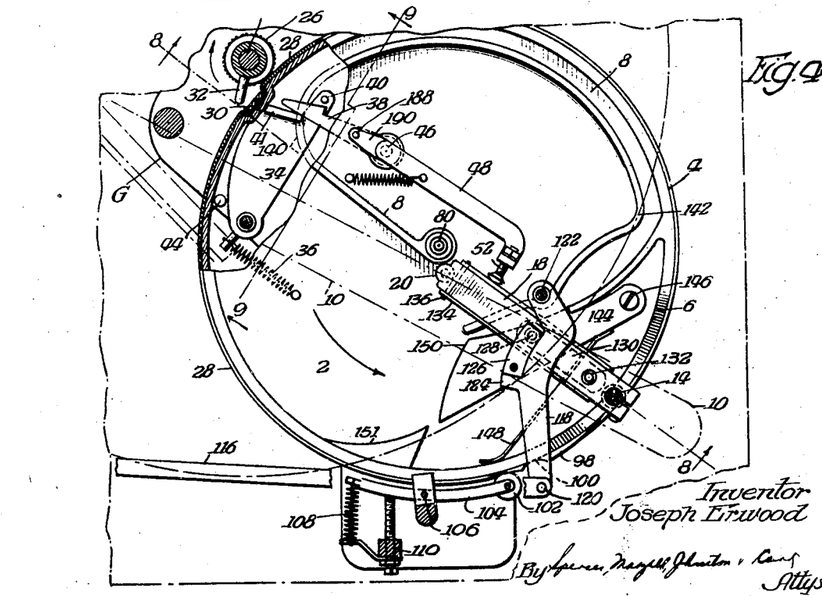
Figure 4 is a view similar to the view shown in Figure 3 but with the various parts of the record changing mechanism shown in the positions which they will occupy when the playing of the record has just been completed and the record changing mechanism has just begun to function.

The positions of the various portions of the mechanism just after rotation begins are shown in Figure 4. As rotation proceeds pawl 34 is reset when it strikes against re-setting pin 44 and it is held in place by the re-engagement of catch 38 with pin 40, the latter being in turn attached to pawl 34.

The catch 38 which is on the under side of cam carrier 2 is fixed rigidly to a shaft 46 extending through to the upper part of cam carrier 2 and also rigidly connected on the upper side of cam carrier 2 to an arm 48 which is normally urged in a clockwise direction by means of a spring 50. Hence, catch 38 is normally spring pressed against pin 40. On one extremity of arm 48 is an adjustable screw 52. When the record stops playing the guide arm 18 is approximately in the position shown in Figure 4 in which position it presses against screw 52 causing arm 48 to be moved in a counterclockwise direction and releasing catch 38 from pin 40 thereby initiating the rotation of cam carrier 2, as previously described. Thus, when tone arm 10 is just beyond the dotted position 10a, shown in Figure 1, the pawl 34 will be tripped and the cam carrier 2 will begin to rotate, as shown in Figure 4.

Figure 5:
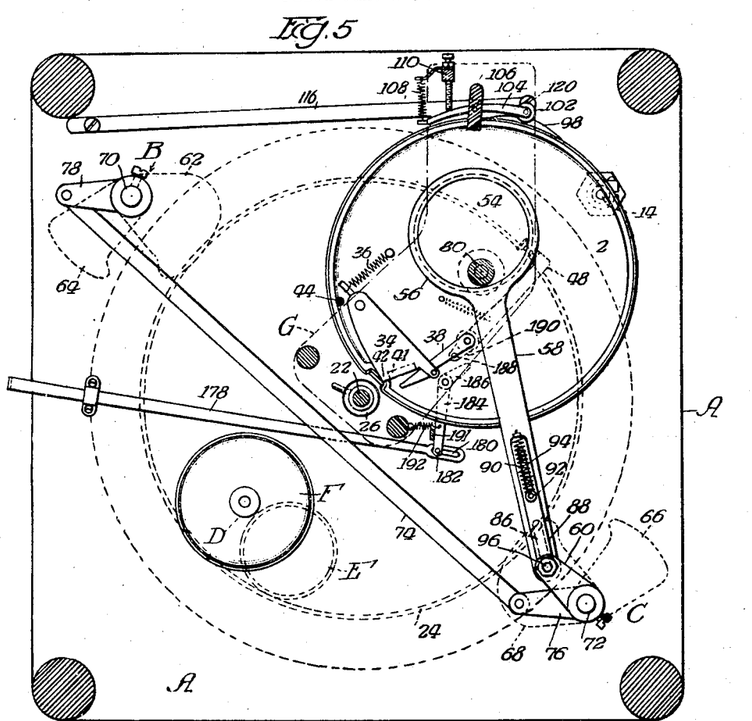
Figure 5 is a view looking up from the bottom of Figure 2 taken through the line 5—5 of Figure 2.

Beneath cam carrier 2 is an eccentric 54, as shown in Figure 5, around which is an eccentric drive 56 integral with an arm 58 connected to a pitman 60 which serves to drive or move changer blades 62, 64, 66 and 68.

Each set of changer blades is attached by means of a collar or other suitable means to a shaft, changer blades 62 and 64 being attached to shaft 70 and changer blades 66 and 68 being attached to shaft 72. The manner of this attachment is more clearly shown in Figures 6, 6a, 7, 7a, 12 and 13. It will be observed that a lever connects an arm 76 which in turn is attached to shaft 72 with an arm 78 connected to shaft 70, whereby any movement imparted to pitman 60 by means of eccentric 54 through arm 58 is transmitted in like manner through lever 74 to changer blades 62 and 64.

The eccentric 54 and cam carrier 2 are mounted in fixed relationship so that the rotation of cam carrier 2 about its central axis on a shaft 80 likewise causes eccentric 54 to rotate about said shaft. A fixed relationship may be maintained in any suitable manner, for example, by keying the eccentric to the cam carrier or to a collar which forms a part of the underside of the cam carrier.

Figure 8:
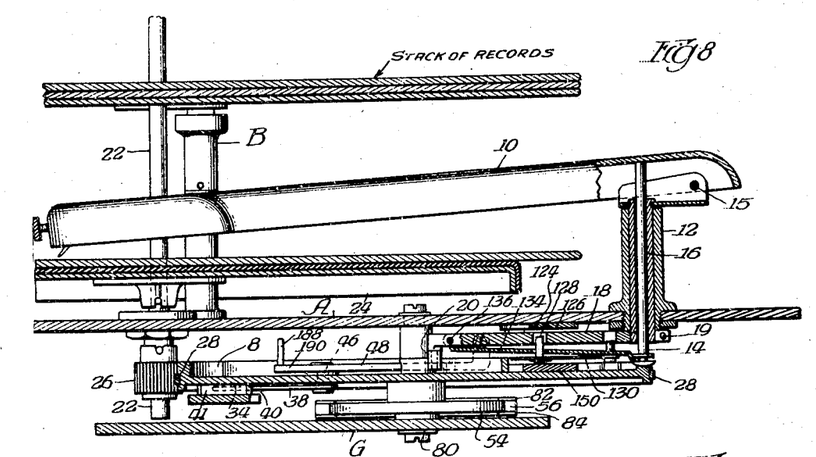
Figure 8 is a sectional view taken through the line 8—8 of Figure 4.
Figures 9, 10, 11, 12, 13, 14:
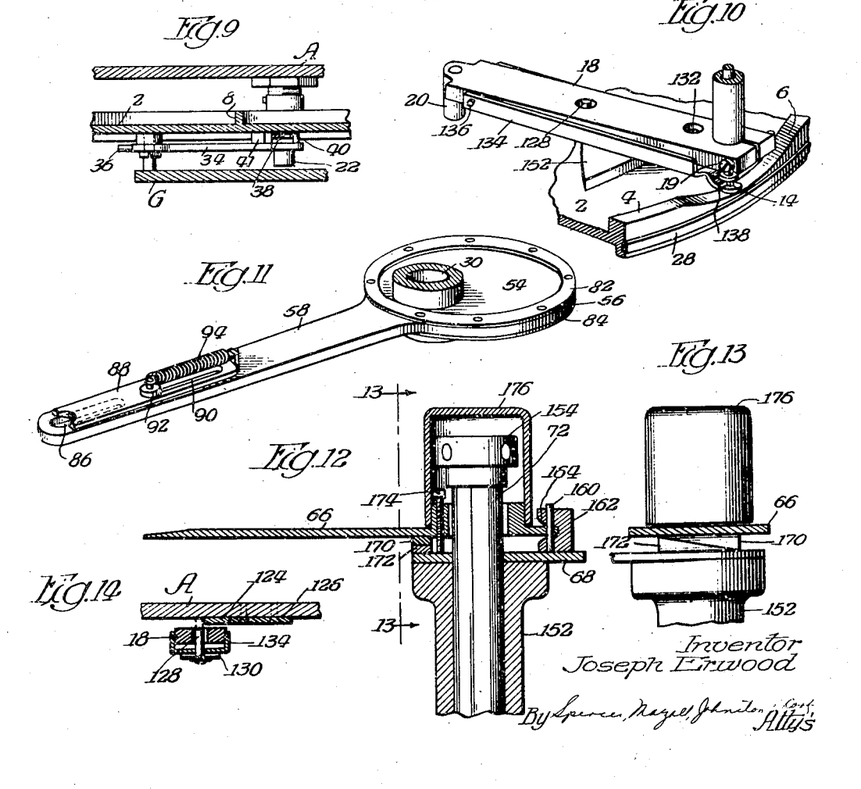
Figure 9 is a detailed sectional view taken through the line 9—9 of Figure 4.
Figure 10 is a perspective view of the lift cam and lift member as well as the guide arm and guide cam which serve to lift and guide the tone arm during a record changing operation.
Figure 11 is a view in perspective of an eccentric driving mechanism for actuating the record changer blades.
Figure 12 is a cross sectional view of the record changer blade shown in Figures 6 and 7, taken along 12—12 of Fig. 1.
Figure 13 is a view taken through line 13—13 of Figure 12.
Figure 14 is a detailed cross section taken through the line 14—14 of Figure 3.

As will be observed in Figure 5, eccentric 54 is surrounded by a drive member 56 and is free to move within said drive member. The relationship between these two members may be maintained in any suitable manner. For example, as shown in Figures 8 and 11, an annular member 82 and a second similar annular member 84 may be screwed or riveted or otherwise attached to the upper and lower sides, respectively, of eccentric drive 56. Members 82 and 84 are of sufficient width to overlap eccentric 54. In this way eccentric 54 and eccentric drive 56 are held in movable relationship with respect to each other. It will be understood, however, that any other convenient method may be employed maintaining this relationship. For example, the rim of eccentric 54 may be shaped so as to fit into a complemental recess on the inner face of eccentric drive 56 in such a way that eccentric 54 rides on a portion of arm 56 which also keeps eccentric 54 from moving downwardly. Upward movement may be prevented by means of a series of washers in the lower face of eccentric drive 56 overlapping the lower face of eccentric 54.

Referring again to Figures 5 and 11, one of the features of the invention shown therein may be termed a pressure release which comprises an elongated slot 86 in drive arm 58 and a plate 88 having a similar slot 90. A bolt, stud or rivet 92, which is fastened to eccentric drive arm 58, projects through slot 90 and is so constructed that plate 88 may move back and forth guided by bolt 92 and slot 90. A spring 94 is fastened to bolt 92 at one end and to plate 88 at the other end in such a way as to normally urge plate 88 against a bolt or other suitable connecting member 96, which connects arm 58 with pitman 60. The tension in spring 94 should be sufficiently strong so that in normal operation the plate 88 will not tend to give or recede as pitman 60 is moved by arm 58, but in the event that a record jams in the changer blades or if for any other reason an unusual force is required to move pitman 60, then spring 94 will permit plate 88 to recede, thereby causing the connecting member 96 to move in groove 86 in a direction toward eccentric 54 and preventing any damage to the mechanism or the records.

Referring to Figures 3 and 4, another feature of the invention is the provision of an outwardly extending cam surface 98 on cam carrier 2 which is preferably above the rubber belt 28 or other drive means, as shown. In this outwardly extending cam portion is a recessed portion 100 into which is adapted to fit a cam roller 102. Cam roller 102 is carried by an arm 104 which is pivoted on a pin 106. The opposite end of arm 104 is attached to a spring 108 which normally tends to press roller 102 inwardly. This inward movement is limited, however, by a set screw 110 which is normally so adjusted that cam roller 102 will strike against the raised cam portion 98 but not against the remainder of the periphery of cam carrier 2, thereby preventing any undue wear either on roller 102 or on the periphery of cam carrier 2. Recess 100 and the slope of cam portion 98 are preferably so constructed that the roller 102 enters recess 100 rather sharply and leaves it more gradually. By entering recess 100 sharply, roller 102 gives cam carrier 2 a final push which is necessary to center gap 30 opposite pinion or drive member 26. By leaving recess 100 relatively gradually the starting of cam carrier 2 during a record changing operation is made easier and the rolling of cam roller 102 part way down the incline of cam portion 98 tends to aid the starting movement. Thus it will be seen that this arrangement not only insures that cam carrier 2 will be stationary during the playing of a record, but it also causes gap 30 to be centered opposite pinion 26 and assists the action of pinion 32 against pawl 34 in starting the cam carrier 2.

Still a further feature of this invention is to be found in the manner in which different sized records may be played with only a single simple adjustment. In Figure 1 it will be noted that there is a slide button 112 adapted to move in a slot 114. Movement of this button determines the point at which the tone arm 10 will be placed on the record. In the embodiment herein shown, when the button 112 is in the position illustrated in Figure 1, the tone arm 10 is set to play a 12-inch record. When the button 112 is moved to the opposite end of slot 114, it is set to play a 10-inch record. Button 112 is directly connected to a lever 116 as shown in Figure 3. Lever 116 in turn is connected to an arm 118 at point 120. Arm 118 is pivoted at point 122 so that any movement of lever 116 which is imparted thereto by button 112 is transmitted to arm 118 and causes the latter to move. Arm 118 contains a projecting stop member 124 which is withdrawn from its position shown in Figure 3 when arm 118 is moved in a counterclockwise direction. When this occurs, plate 126 becomes the stop member and the record changing mechanism will now play a 10-inch record. As shown in Figure 3, it is set to play a 12-inch record.

The position of stop members 124 and 126 makes it possible to play a selected size record merely by moving button 112 because of the fact that a pin 128, which is more clearly shown in Figures 8, 10 and 14, impinges against one or the other of these stop members. Pin 128 is fastened to a strip of spring metal 130 which in turn is fastened by means of a screw, rivet or other suitable means 132 to a flanged member 134 disposed on the under side of guide arm 18 and pivoted at point 136. Flanged member 134 is preferably connected at its opposite end 138, as shown in Figure 10, to lift pin 14. It is not absolutely essential that the portion 138 of flanged member 134 be connected to lift pin 14 as long as it is free to ride up and down, but for positive action it is preferable that such a connection be made, as, for example, in the manner shown in Figure 10, so that flanged member 134 must necessarily drop when lift member or pin 14 falls into recess 6.

When the record changing mechanism begins to operate as shown in Figure 4, the pin 128 is spring pressed upwardly against stop plate 126. As cam carrier 2 continues to rotate in a counterclockwise direction, lift member 14 rises out of recess 6 onto the top of lift cam 4 and thereby causes flanged member 134 to likewise rise until the flanges thereof fit over guide arm 18. With continued rotation of cam carrier 2 in a counterclockwise direction the cam roller 20 on guide arm 18 moves along the internal cam 8. At the same time pin 128 is pressed upwardly by spring metal strip 130 against stop plate 126 but as cam roller 20 continues to move along internal cam 8, pin 128 moves over stop plate 126 in the direction of stop plate 124.

At the same time the tone arm 10 is swinging outwardly and when it reaches a point in its outward swing directly above the point where it would start to play a 12-inch record, the pin 128 passes over stop 124 and the spring metal strip 130 causes pin 128 to move upwardly, as shown in dotted line in the cross sectional view in Figure 14 taken along the line 14—14 of Figure 3, thereby preventing the tone arm 10 from going in an inward direction and directly setting the point at which the tone arm will eventually set down to play the record. At this time the cam roller 20 is approximately at point 140, as shown in Figure 4, and is now entering the closed portion of internal cam 8 thereby continuing the swing of tone arm 10 outwardly and keeping it outside of the record while the record changing operation is taking place.

When the record changing operation is completed tone arm 10 begins to move inwardly again as cam roller 20 reaches point 142 and the inward movement continues until lift member 14 reaches the recess 6 in lift cam 4, at which point the tone arm begins to drop gradually on the record, the rate at which it drops depending upon the slope or incline of cam recess 6 shown in perspective in Figure 10. Just prior to this time or contemporaneously, the roller 20 in cam track 8 begins to move against member 144 which is pivoted at point 146, and pressed inwardly by a spring 148. With a 12-inch record setting, the pin 128 is now up against stop plate 124, as shown in Figure 14, and since cam carrier 2 is still moving it is necessary for roller 20 to press outwardly against guide plate member 144, thereby causing the latter member to be deflected outwardly against the pressure of spring 148 until roller 20 reaches the point 150. At point 150 roller 20 begins to roll down along the edge of guide plate 144 and the latter begins to move inwardly due to the pressure of spring 148. At the same time lift member 14 is reaching the bottom of recess 6. A raised area 151 is provided to keep roller 20 away from spring 148 in the event anyone turns the turntable backwards. When lift member 14 finally reaches the bottom of recess 6, the stylus carried by the tone arm 10 is now on the record, guide plate 144 has been pressed back to position by spring 148, cam carrier 2 is stopped and the mechanism is in the position shown in Figure 3. As soon as lift pin 114 drops into the bottom of recess 6, as shown in Figures 3 and 10, the stop pin or detent 128 is pulled downwardly so that pin 128 is no longer in the dotted position against stop plate 124 shown in Figure 14, and the guide arm 18 is now free to move inwardly from the position shown in Figure 3 to the position shown in Figure 4 while the record is playing. As soon as the position shown in Figure 4 is reached, the cycle is repeated and a new record is dropped into position. If it is desired to play a 10-inch record, then by moving stop 124 out of the way by means of lever 116 and arm 118 the detent 128 operates against stop 126 and permits the tone arm to set down on the record at a point farther inward. To summarize, as shown in Figure 3, when a 12-inch record is being played the detent or stop 128 will lodge against the projecting member 124 of arm 118 to prevent inward movement of the tone arm beyond the initial grooves of the record. As previously indicated, however, arm 118 is pivoted around pivot 122 and when arm 116, actuated by button 112 (Figure 1), is moved to the right, arm 118 will move around pivot 122 in a counter-clockwise direction, thereby also moving the projecting portion or stop member 124 and permitting the detent or stop 128 to move further inwardly until it lodges against plate 126. In this latter position the tone arm 10 will be above the initial grooves for a 10-inch record. It will be understood, of course, that the plate 126 and the pivot 122 are fastened to the motor board A.

Turning to Figures 6, 6a, 7, 7a, 12 and 13, reference will now be made to the operation of the record changer blades 62, 64, 66 and 68. As illustrated, two pairs of blades are employed although three or more pairs may be used if desired. The idea of providing several pairs of blades of this general type in order to support a stack of records and to separate and dispense these records one at a time into playing position from the bottom of the stack is not in itself new, but the specific type of mechanism employed for this purpose is believed to be an improvement upon existing or previously proposed mechanisms of this type in that it causes more positive action and when employed in conjunction with the actuating mechanism previously described makes it possible to dispense a stack of either 10-inch or 12-inch phonographic records into playing position without making an adjustment of the record changer blades each time a stack of different sized records is used. In other words, the only adjustment necessary is the movement of button 112 shown in Figure 1, the operation of which has been previously described.

Figures 6, 6A, 7, 7A:
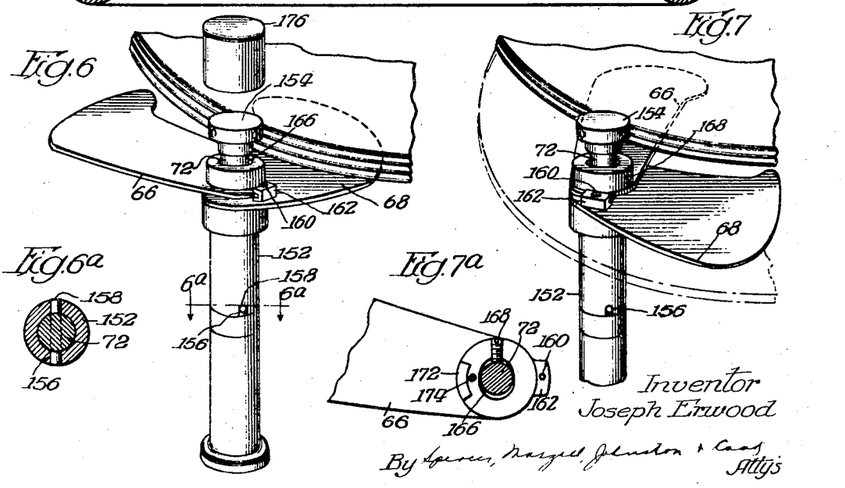
Figure 6 is a perspective view of the record changer blades showing the position of these blades in supporting a stack of records while a record is being played or when the record changing mechanism is not being actuated.
Figure 6a is a cross section taken through the line 6a—6a of Figure 6.
Figure 7 is a view in perspective showing the position of the record changing blades when the record changing mechanism is in operation just after a record has been dropped.
Figure 7a is a cross section through line 7a—7a of Figure 7.

In Figure 6 the record changer blades 66 and 68 are shown in the positions which they occupy when another record is being played and when the record changing mechanism is not in operation. It will be observed that the lower blade 68 is supporting a stack of records while the upper blade 66 is held outward away from the stack. The relationship of the two blades is such that blade 66 when the mechanism is operated, will pass inwardly at a point approximately between the lowermost record and the next succeeding record. It will be understood that the other pair of blades 62 and 64 occupy a similar relationship and what is said with respect to blades 66 and 68 also applies to blades 62 and 64. When the record changing mechanism is in operation, blades 66 and 68 move clockwise from the position shown in Figure 6 to the position shown in Figure 7 so that the upper blade 66 passes between the lowermost record and the next succeeding record, and in doing so serves to support the remainder of the stack of records while the lower blade 68, moving in substantially fixed relationship with blade 66, moves away from the bottom of the lowermost record and permits said record to drop. The record is guided while it falls by central shaft 22, shown in Figure 2, and the fall is broken to a large extent by the compression of the air beneath the record.

Referring more particularly to Figure 6, the changer blade 68 is integral with a sleeve 152 which fits around shaft 72. Blade 66 fits loosely above blade 68 on shaft 72. At the top of shaft 72 is a collar 154 which limits the upward movement of blade 66. Running through shaft 72 is a pin 156 which is adapted to fit into a recess 158 in the lower part of sleeve 152. A cross sectional view taken along the line 6a—6a of Figure 6 is shown in Figure 6a. Any rotation of shaft 72 is imparted to sleeve 152 and in turn to blade 68 by means of pin 156. Changer blade 66 has any movement of blade 68 imparted to it by means of a pin, bolt or other pivoting member 160 which passes through the rear portion of blade 66 in the manner shown in Figure 12. Pin 160 is mounted in an element 162 which in turn is fastened to or is integral with changer blade 68. Element 162 is provided with a recessed portion 164 which substantially prevents wobbling from side to side of blade 66.

It will be observed from Figure 12 that separating changer blade 66 is not pivoted on shaft 72 but on pivot 160 due to the fact that it fits only very loosely around shaft 72. In fact the hole 166 in separating changer blade 66 through which shaft 72 passes is preferably more or less elliptical in shape, as shown in Figure 7a in order to insure that blade 66 will pivot with a slight upward movement around post or pivot 160 rather than around shaft 72. A set screw 168 may be provided to limit the movement of blade 66 if desired. Between blade 66 and blade 68 is a pair of sloped members 170 and 172 sloping in opposite directions, member 170 being affixed to separating changer blade 66 and member 172 being affixed to stack supporting changer blade 68. The arrangement of these members is such that as blade 68 begins to rotate the sloped element 170 attached to blade 66 begins to ride up the slope of element 172 attached to blade 68 thereby causing blade 66 to rise gradually while it is rotating. As will be readily understood, the upward movement of blade 66 is made possible by the fact that it is pivoted relatively loosely to pivot 160 and is associated with element 162 in such a way as to permit said upward movement without allowing substantial wobbling or side to side movement. In the event, therefore, that the records are of different thicknesses, as is the case with 10-inch and 12-inch records, or in the event that the records are warped the member 66, while rising, will gradually pass between the lowermost record and the next succeeding record. This particular arrangement makes it unnecessary to adjust the changer blades for playing different sized records, even though there may be considerable variation in the thickness of the records. For instance, it is well known that a 10-inch record is normally about .080 inch thick while a 12-inch record may be from .090 to .110 inch thick. The limit of the upward movement of separating blade 66 is determined by collar 154. A set screw 174, as shown in Figure 12, may be provided to set the initial height of the blade. A cap 176 is also preferably provided in order to enclose the top of the mechanism.

When it is desired to remove records that have been played, the sleeve 152 is raised so as to clear pin 156. As soon as pin 156 is cleared both blades can be swung out of the way of the records. Each pair of blades is swung out of the way in this manner and the played records can then be removed. Thereafter each pair of blades is swung back into position and a new stack of records may be loaded on shaft 22. It is immaterial whether the records are all 10-inch records or all 12-inch records, because the apparatus will play either type of record equally well, regardless of the difference in the thickness of the records, provided, however, that the slide button 112, shown in Figure 1, is in the proper position as previously described.

Another feature of the invention is the provision of a manually operated lever 178, shown in Figure 5. This lever may be controlled from a sliding button similar to button 112, or in any other suitable manner. In one end of the lever 178 is a slot 180 which engages with a pin 182 that in turn is fixed to an arm 184. Arm 184 is fixed to a second arm 186 which is adapted to engage a pin 188 on another arm 190, the latter arm being a continuation of arm 48, as shown in Figures 3 and 4. The purpose of this arrangement is to permit the record changing apparatus to be started at any time by manual operation. For instance, when a stack of records is first loaded onto the record changing blades the movement of lever 178 will actuate arm 184 which in turn actuates arm 186, and the latter in turn actuates arm 188, thereby causing catch 38, shown in Figures 3 and 4, to be tripped and releasing pawl 34 so that the projecting member 32 catches against the edge of the pawl 34 and starts the rotation of cam carrier 2 in the manner previously described. Likewise, if the user wishes to reject a particular record and play another record, the movement of manually controlled lever 178 will accomplish the result in a similar manner. Manually controlled lever 178 is restored to position by a spring at point 192 which pulls arm 184 against stop 191, or in any other suitable manner.

No detailed explanation has heretofore been given of particular elements upon which the described members are assembled because it is believed that anyone skilled in the art will readily recognize the manner of the assembly from an examination of the drawings. In general, the various mechanisms described are mounted upon two plates, namely, plate A, above which is the turntable 24, and the record changer plate mechanisms B and C, as well as the tone arm 10 and the post 12. Also above plate A is the drive D which rotates turntable 24 through a wheel E. This particular type of drive mechanism is old and well known in the art and while this type of drive mechanism is generally preferred from the standpoint of the present invention it would also be possible to drive the center shaft 22 directly from the motor instead of first driving the turntable which in turn drives the center shaft 22.

Below the plate A is the motive means F which in the case of the present invention is preferably an electric motor. The other principal means for holding the various parts of the mechanism in their positions is a lower plate G. As shown in Figure 2, substantially all of the actuating mechanisms heretofore described are held in place between plate A and plate G by means of bolts, studs or shafts. Inasmuch as a detailed description of these members would unnecessarily complicate the explanation of the invention and would in any event be apparent to those skilled in the art, no such description is believed to be necessary.

The operation of the automatic phonograph record changer will now be described in detail. Referring to Figures 1, 2 and 8, a stack of records is placed in position on the record changer blade mechanisms generally illustrated at B and C. At this time the tone arm 10 may be resting on a post 11 shown in Figure 2, or it may be in any other position. The lever 178, shown in Figure 5, is pushed inwardly thereby moving arm 48 and disengaging catch 38 from pin 40. This starts the rotation of cam carrier 2 in the manner already described with reference to Figure 4. It will be understood that prior to this time the motor F is started by any suitable means so that the shaft 22 is being rotated by turntable 24, and pinion 26, which is keyed to said shaft, is likewise rotating in the direction of rotation of the turntable which in the present case is clockwise.

Let us assume that the tone arm 10 was initially in the position shown in full line in Figure 1, then the actuating mechanism for the record changer and for moving the tone arm out of the way while a record is being changed is in the position shown in Figure 3. In this position the tone arm is down, but as soon as cam carrier 2 begins to rotate, the lift member 14, as shown in Figure 8, will begin to ride out of the depression 6 up onto the elevated portion of track 4, which runs around the upper face of cam carrier 2. As lift member 14 rises it will raise the tone arm 10 because the latter is pivoted on a pivot 15. It will also be recalled that tone arm 10 is capable of rotating or swinging around a sleeve 16 mounted in post 12 and that sleeve 16 is attached to a guide arm 18 by means of a set screw 19 or any other suitable means, as shown in detail in Figure 10.

Guide arm 18 is provided with a guide roller 20. As the rotation of cam carrier 2 continues, guide arm 20 is guided into internal cam track 8 in the top of the cam carrier 2. This causes guide arm 18 to turn sleeve 16 thereby swinging tone arm 10 in an outward direction to the position 10b shown in dotted lines in Figure 1. All of the time that cam carrier 2 is rotating, eccentric 54 is likewise moving and as it moves in eccentric drive 56 it actuates arm 58 which in turn actuates pitman 60, as shown in Figure 5. As pitman 60 turns it moves shaft 72 and simultaneously causes the movement of arm 76 and connecting lever 74 so that both sets of changer blades generally shown at B and C are actuated simultaneously. Prior to this actuation the relative positions of both sets of changer blades is as shown in Figure 6, but as the eccentric 54 moves, the lower changer blade in each pair begins to move out from beneath the lowermost record in the stack of records. The upper changer blade which might be called the separating blade, moves in fixed relationship with the lower changer blade in each pair in the manner already described, thereby separating the lowermost record from the next succeeding record and at the same time supporting the stack of records so that as each of the lower changer blades moves out from underneath the stack the lowermost record will drop and the remainder of the stack will be supported by the upper changer blades. At this point the eccentric 54 has reached its maximum drive in one direction and the drive of pitman 60 is reversed as eccentric 54 begins to pull arm 58 in the opposite direction. Thereupon the upper changer blades and the lower changer blades both move in reverse directions in substantially fixed relationship until the position shown in Figure 6 is again reached. At this point the lower changer blades will again be supporting a stack of records and the upper changer blades will be in position to separate another record from the stack when the actuating mechanism is again started. Also at this point the cam carrier 2 and the eccentric 54 cease to move as the gap 30 in the cam carrier shown in Figure 3 reaches a point opposite pinion 26. The pinion 26 is now out of engagement with the rubber friction belt 28 or other drive means that may be employed so that cam carrier 2 can no longer rotate. The pin 32 is now projecting into gap 30 but cannot start the movement of cam carrier 2 because pawl 34 is held out of the path of pin 32 by means of catch 38 and pin 40 in the manner already described. The record is now ready to play.

When the record begins to play, the lift member 14 is at the bottom of depression 6, as shown in Figures 8 and 10, and the position of all of the elements of the apparatus is as shown in Figure 3. The flanged member 134 on guide arm 18 is down causing pin 128 to be pulled down, as shown in Figure 8. As the record plays, roller 20 moves from the position shown in Figure 3 toward the center post 80 of cam carrier 2 approaching the position shown in Figure 4. The remainder of the parts of the apparatus remain substantially as shown in Figure 3. The cam roller 102 is in recess 100. The lift member 14 still remains down as shown in Figure 10. The pin 128 is down, as shown in Figure 8.

As soon as the record is completed the stylus traveling in the grooves at the end of the record causes tone arm 10 to move inwardly to approximately position 10a at which point guide arm 18 strikes against set screw 52 and moves arm 48 which in turn disengages catch 38 from pin 40 thereby releasing pawl 34 and permitting the portion 42 of pawl 34, shown in Figure 3, to project into the path of moving pin 32. Thereupon pin 32, which is rotating clockwise in the same direction as the record turntable, moves against pawl 34 and starts cam carrier 2 rotating in a counterclockwise direction. The position of the actuating mechanism is then as shown in Figure 4. Cam roller 102 has moved out of cam recess 100 in the raised peripheral cam 98 and is now rolling down the incline, as shown in Figure 4, thereby assisting in the starting operation. As soon as pinion 26 engages with the friction belt 28 on the periphery of cam carrier 2, or with other suitable peripheral driving means, the rotation of cam carrier 2 about shaft 80 continues by direct drive from center shaft 22. After the cam carrier 2 has moved a short distance, pawl 34 strikes against post 44 which extends upwardly from bottom plate G, thereupon pawl 34 is pushed inwardly and pin 40 thereof is caught and held by catch 38. This occurs before the pin 32 has completed one turn.

As cam carrier 2 continues to rotate, roller 102 is held away from the periphery of the cam carrier by means of set screw 110 acting on arm 102 which normally presses cam roller 102 inwardly due to the action of spring 108. In this way cam roller 102 does not lie directly against the periphery of cam carrier 2 and is not brought into action again until it leaves the projecting cam surface 98.

In the meantime lift member 14 has begun to rise out of depression 6 thereby causing the tone arm 10 to rise from the record and tone arm 10 is held in raised position as long as lift member 14 rides on the elevated portion of lift cam 4.

When lift member 14 is riding on top of lift cam 4 the flanged member 134 which engages with lift member 14 at point 138 is pushed upwardly thereby causing pin 128 to be pushed upwardly but at this time pin 128 is pressing against plate 126 and since plate 126 is solid at this point nothing happens except that pressure is being exerted against pin 128 by means of the spring metal strip 130 which is attached near one end to pin 128 and at the other end by means of a screw or rivet 132 to the lower side of flanged member 134, as shown in Figure 8.

As the movement of cam carrier 2 continues in a counterclockwise direction, cam roller 20 on the end of guide arm 18 is guided against or into cam track 8 and the stop 128 moves beneath stop plate 126 from the general position shown in Figure 4 toward the general position shown in Figure 3. When the cam roller 20 is approximately at point 140, as shown in Figure 4, the stop 128 rides over the end of stop plate 124, assuming that the machine is set for playing a 12-inch record, or over the end of stop plate 126 if arm 18 has been pushed back for playing a 10-inch record in the manner previously described. In the latter event, the inward movement of the pin or detent 128 would take place somewhat sooner. In either event when this point is reached, the tone arm 10, although free to move outwardly is no longer free to move inwardly beyond the record starting position.

The cam roller 20 now continues in cam guide track 8 causing the tone arm 10 to swing farther out into position 10b, shown in Figure 1, at which point a new record will be deposited by the record changer blade through the elements actuated by the eccentric 54 in the manner already described. After the record has been deposited the cam roller 20 will begin to move inwardly again at point 142. At this point the lift member 14 is still riding on the top of cam 4 and hence the tone arm is still raised, but thereafter the lift member 14 begins to gradually sink into the recess portion 6 and the tone arm begins to drop gradually toward the record playing position, Since guide arm 18 and cam roller 20 cannot move any farther inwardly than the position fixed by detent 128, the cam roller 20 will begin to press against spring pressed guide member 144 which is pivoted at point 146 and normally pressed into the position shown in Figure 4 by spring 148. This helps to maintain the position of guide arm 18 while the lift cam 14 is being gradually eased into the depression 6 and the tone arm 10 now in the full line position shown in Figure 1 is being brought downwardly toward the record.

As tone arm 10 approaches the record, cam roller 20 slides off the end 150 of spring pressed member 144 and the needle touches the record and begins to play when the position shown in Figure 3 is reached. At the same time, gap 30 is opposite pinion 26, catch 38 is holding pin 40 which in turn is holding pawl 34 out of the way of pin 32, and roller 102 has moved over the projecting guide surface 98 into recess 100 just at the moment that the pinion 26 has become disengaged from the drive belt 28. As roller 102 drops into recess 100 relatively abruptly it gives the final impetus or motion to cam carrier 2, thereby centering it and placing it in the position shown in Figure 3. The apparatus is now ready for another cycle of operations after the record has been played. Alternatively, if the user does not wish to play that particular record, lever 178 may be moved inwardly thereby causing pawl 34 to be tripped and again starting the rotation of the record changing mechanism.

The apparatus described has relatively few moving parts, the actions of which are simple and positive. The actuating mechanism for the record changing blades, including cam carrier 2 and eccentric 54, is stationary while the record is being played, as distinguished from commercially available devices of this type in which the actuating mechanisms continuously rotate and operation of the record changer blades depends upon the synchronization of certain engaging or connecting members with the rotating members at a predetermined time. In such mechanisms it often happens that if a predetermined engagement is missed for any reason the rotating parts must continue to rotate a substantial number of times before it is possible for the engagement to take place. In the present device, on the other hand, only one rotation of the cam carrier 2 is involved.

The present type of apparatus provides a very simple mechanism for changing from 10-inch to 12-inch records, or vice versa, without moving the changer blades. The same rotative means is utilized to raise the tone arm and to swing it back and forth. Positive means are provided for centering and keeping the record changer actuating means stationary while a record is playing. The apparatus may be used with any of the usual types of phonographic mechanisms regardless of whether the central shaft is driven by a motor through the turntable as herein described, or by direct drive. Simple means are provided to keep a record from breaking or to keep the mechanism from jamming in the event that a warped record jams against the changer blades. Simple means are provided to separate the changer blades while they are rotating during a record changing operation and thereby compensate for differences in the thickness of records, or for warpage. The latter means include among other things the pivoting of the upper or separating changer blade at a point back of the shaft carrying the lower changer blade, thereby permitting greater leverage and avoiding to a greater extent the possibility of jamming the upper changer blades against the records.

The apparatus also provides for simplified means in starting the record changer actuating mechanism or in rejecting a record. The particular means for raising the tone arm which includes passing the lift member 14 directly through the pivot 12 around which the tone arm 10 rotates, is believed to represent a substantial improvement. Furthermore, the slope of the depression or recess 6 can be so regulated that the tone arm picks up twice as fast as it lets down on the record. This is accomplished by having a steeper slope on the pickup than when the tone arm is set down. The principle of varying slopes is also made use of in the recess 100 in the raised cam 98. In this case a slope of lesser degree is used to start the cam roller 102 out of the recess 100 when cam carrier 2 begins to rotate while the slope when cam roller 102 re-enters recess 100 is relatively steep. The eccentric drive through a pitman is also believed to be a substantial contribution to the art because it permits the force to be exerted positively in actuating the record changer blades and makes it possible to have the blades move faster or slower, as the case may be, during certain portions of the record changing operation.

Figure 15:
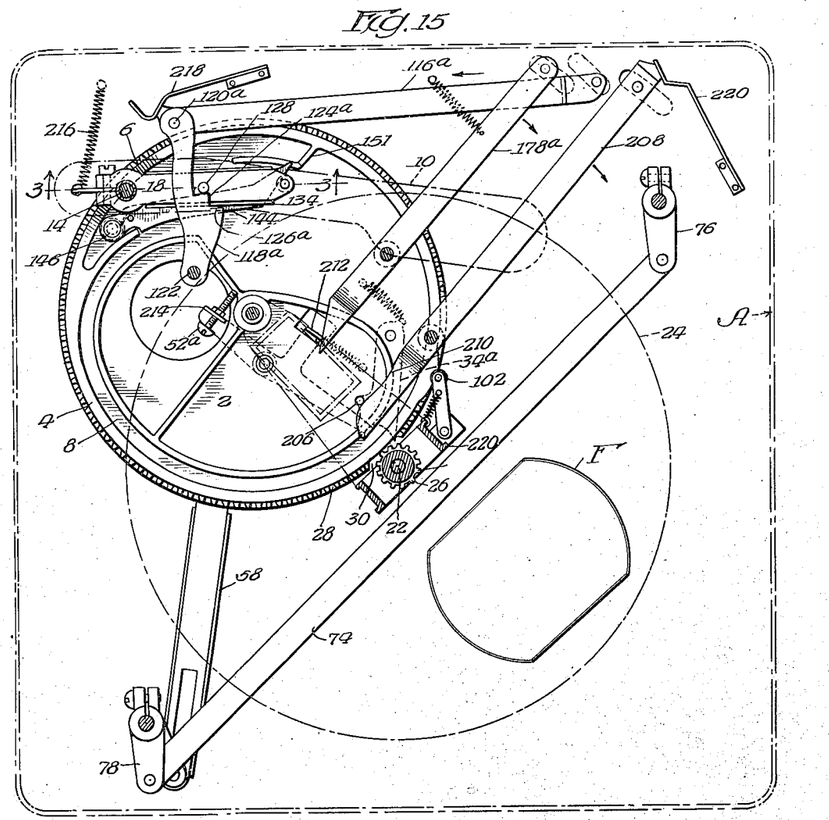
Figures 15 to 18, inclusive, illustrate a modified form of construction.

In the modified form of the invention illustrated in Figures 15 to 18, inclusive, certain changes in construction have been made. In describing this form of the invention, those parts which are similar to previously described parts will be given the same numbers. The view in Figure 15 is taken looking downward from a point just beneath the supporting platform A and hence, is generally similar to the type of view shown in Figures 3 and 4. The turntable 24 is mounted above the platform A and the motor F is mounted below in the same manner as shown in Figure 2. The number of the record changer elements 74, 76 and 78 is the same as that described in connection with Figure 5. The eccentric drive is effected through an arm 58 in the same manner as described in connection with Figure 5. The cam carrier 2 is constructed in the same general manner as previously described, being provided with an elevated cam track 4 around the outer edge and an internal cam track 8. The elevated cam track 4 has a recessed portion 6, as previously described, and the lifting of the tone arm is accomplished in the same manner as previously described. Portion 144 of the internal cam track 8 is pivoted around point 146 to facilitate dispensing a 10-inch record onto the record turntable in the manner previously described. The movable track portion 144 just clears a fence or enclosure 151 which prevents any damage to the mechanism in case the turntable is turned backwards. The general position of the tone arm 10 and of the mechanism is the same as that described in connection with Figure 3. In other words, the tone arm 10 is just ready to set down on the edge of the record, as illustrated in the drawings. At this point the stop member 128, which is associated with guide arm 18, engages with a stop 124a, which is comparable to the stop 124 shown in Figure 3. The particular setting shown is intended to cause the tone arm to set down at the proper point for playing a 12-inch record. In order to play a 10-inch record, the lever 116a is moved in the direction of the arrow, thereby causing the element 118a to move around pivot 120a and permitting the stop 128 to engage the stop 126a instead of the stop 124a. In this way the tone arm 10 is allowed to proceed inward a further predetermined distance until it is opposite the position at which a 10-inch record may be played. The principal difference between this construction and the construction shown in Figures 3 and 4 is that in Figures 3 and 4 the stop 126 is a plate mounted on the frame A, while in the present construction the corresponding stop 126a is not mounted on the frame but on the lever element 118a. It will be appreciated that any number of stops may be made merely by changing the shape of the lever 118a. The lever 118a is pivoted around point 122 which is associated with frame A in the same manner as in Figures 3 and 4. The general arrangement and construction of the guide arm 18 is the same as previously described.

Figures 16, 17, 18:
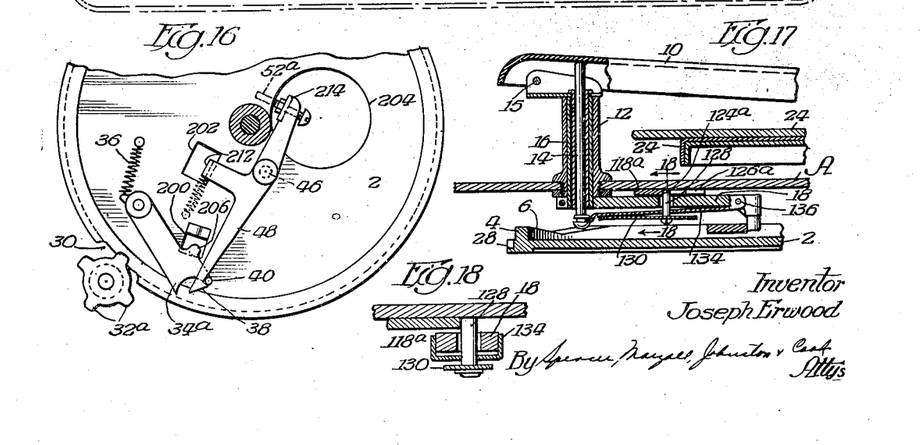

As shown in Figure 17, the guide arm 18 is connected to a sleeve element 16 which in turn is connected to the tone arm 10 through an element pivoted at point 15. Surrounding the sleeve element 16 is a post 12. The pin 14 which serves to raise and lower the tone arm 10 is normally pressed downward by means of a flanged element 134, which is pivoted around point 136. A spring, not shown, coiled around the pivot 136 serves to impart the downward pressure. When the flanged element 134 is pulled downward, as is the case when the pin 14 begins to drop into the recess 6, the stop member 128 is also pulled downward and hence, can no longer strike against stop member 124a or stop member 126a on lever 118a. However, when the pin 14 rides out of the recess 6, as it does during a record changer operation, then the flanged member 134 is raised until it substantially presses against the guide arm 18. The stop 128 then presses against member 118a and is urged in an upward direction by means of a metal spring 130. As soon as it reaches a point where it clears the member 118a, the stop 128 snaps into place against either the stop 124a or stop 126a. This point is shown by the cross-sectional view in Figure 18 taken along the line 18—18 of Figure 17.

A modification of the initiating mechanism is illustrated in Figure 16, wherein one of the initiating members comprises a plurality of projections 32a instead of a single projection, as shown in the previous drawings, and the other comprises a pawl 34a which is similar to the pawl 34 previously described except for a slight difference in shape. The pawl 34a is normally urged in an outward direction by means of a spring 36 and is prevented from moving outward by means of a pin 40 engaging a catch 38. One slight difference in the cam carrier is the provision of a series of holes 200, 202 and 204. Through the hole 200 there extends a pin 206 which is an integral part of the pawl 34a and which can be locked, as shown in Figure 15, by moving the lever 208 in the direction of the arrow until the pin 206 is in the recess 210. The purpose of this mechanism is to lock the pawl 34a so that it can no longer act as an initiating member for the cam carrier 2. In this position, therefore, the record changer no longer operates and the operation of the phonograph is the same as if there were no record changer present.

Through the second hole 202 there extends a projection 212 which engages a member 178a. The function of the member 178a is similar to the function of the member 178, previously described, in that the movement of the member 178a in the direction of the arrow will cause the pawl 34a to be unlatched and initiate the operation of the record changer. This lever is therefore for the purpose of manual rejection in case the operator of the phonograph wishes to reject a record before or during the playing thereof.

The third hole 204 permits an extension or projection 214 to pass directly through the cam carrier 2 from arm 48 and provides for an adjustable screw 52a, which is similar to screw 52 in the drawings previously described. When the arm 18 strikes against the screw 52a at the end of the reproduction of the record, the record changing operation begins in the manner previously described, that is to say, the arm 48 is moved around pivot 46, the catch thereby releasing the pin 40 causing the pawl 34a to move outward and engage one of the projections 32a momentarily until the pinion 26 has engaged the peripheral drive means 28.

The spring 216 is for the purpose of urging the tone arm 10 inwardly toward the record groove after it has been set down in playing position. The use of such a spring is a common expedient and is optional. The leaf spring 218 is for the purpose of insuring that the arm 116a will retain its position in case a 10-inch record is to be played. Leaf spring 220 is for the purpose of insuring that the arm 208 will retain its position in case it is not desired to operate the record changer. The roller 102 in the modified construction shown in Figure 15 is mounted as a part of the housing 220 through which the turntable spindle 22 extends. The arrangement and construction of the roller 102 are slightly different from its arrangement and construction in the previously described apparatus, but the function and purpose are the same.

The present application is a continuation in part of my copending application Serial No. 318,301, filed February 10, 1940, now Patent No. 2,230,106, granted January 28, 1941.

It will be understood that certain variations and modifications may be made in the apparatus described without departing from the principles thereof.

Having thus described the invention, what I claim as new and desire to secure by Letters Patent of the United States is:

1. In a phonographic apparatus having a movable tone arm and a driving mechanism to move the tone arm by raising it and lowering it from a record and swinging it laterally while in a raised position, a mechanism to cause the tone arm to start to play a phonographic record of a predetermined size, said mechanism comprising a laterally extending element connected to and movable with the tone arm, a stop member extending upwardly through a hole in said element, means associated with said element to raise said stop member through said element when the tone arm is raised from the record by said driving mechanism and is being moved laterally and to lower said stop member after the tone arm has set down on the record, a manual control means operatively associated with a plurality of stop members and means for causing said stop members to engage with the stop member on said tone arm element and thereby to hold said element and said tone arm against further inward movement while said tone arm is still in a raised position when it reaches a predetermined playing position depending upon the size of the record to be played.

2. In a phonographic apparatus having a movable tone arm and a driving mechanism to move the tone arm, a mechanism to cause the tone arm to engage with a phonographic record at a predetermined point, said mechanism comprising a guide cam, a cam actuated element guided by said guide cam and connected to said tone arm to cause said tone arm to move laterally while in raised position, a flat manually controlled lever, a spring pressed stop on said guide cam actuated element normally pressed against the flat surface of said lever while the tone arm is in its raised position during a record changing operation, and a recessed portion forming a part of said manually controlled lever in the path of movement of said stop, said spring pressed stop passing over the edge of said recessed portion during a record changing operation, and said recessed portion acting as a stop for said spring pressed stop to prevent further inward movement of the tone arm when the tone arm reaches a predetermined starting position and while it is still raised.

3. In an apparatus of the character described, the combination of a tone arm provided with means for reproducing a record, rotative means comprising a cam carrier carrying a guide cam track, a guide cam actuated element guided by said track during the movement of said cam carrier and connected to the tone arm to cause the tone arm to swing laterally, stop means on said guide cam actuated element, a pair of stop members adjacent said guide cam actuated element, one of said stop members being disposed farther out than the other with respect to the center of a record to be played and each corresponding to a predetermined playing position, each of said stop members being capable of alignment with said stop means on said guide cam actuated element but only one of said stop members being capable of engagement at any given time with said stop means thereby to prevent the inward movement of said tone arm after it has reached a predetermined record playing position and while said stop means is engaged with one of said stop members, and yieldable means forming a part of said cam track, said yieldable means retaining its normal position when one of said stop members is engaged with said stop means on said guide cam actuated element and yielding with the movement of said guide cam actuated element when the other of said stop members is engaged with said stop means on said element.

4. An apparatus as claimed in claim 3 in which one of said stop members is carried by a manually controlled lever.

5. An apparatus as claimed in claim 3 in which both of said stop members are carried by a manually controlled lever.

JOSEPH ERWOOD.